Aug. 10, 1954     P. M. G. TOULON     2,686,261
POLYPHASE FREQUENCY CONVERSION SYSTEM
Filed Jan. 31, 1951     6 Sheets-Sheet 1

INVENTOR
PIERRE MARIE GABRIEL TOULON
BY *William R. Liberman*
ATTORNEY

INVENTOR
PIERRE MARIE
GABRIEL TOULON
BY William C. Liberman
ATTORNEY

Fig. 8

INVENTOR
PIERRE MARIE GABRIEL TOULON

Patented Aug. 10, 1954

2,686,261

UNITED STATES PATENT OFFICE 2,686,261

POLYPHASE FREQUENCY CONVERSION SYSTEM

Pierre M. G. Toulon, New York, N. Y., assignor, by direct and mesne assignments, of seventy-five per cent to Products and Licensing Corporation, New York, N. Y., a corporation of Delaware, and twenty-five per cent to Nelson Moore and William D. Hall, as joint tenants Application January 31, 1951, Serial No. 208,771

9 Claims. (Cl. 250—27)

This application is a continuation in part of my application Serial #188,297, filed October 5, 1950, entitled "Variable Speed Motors Controlled by Electronic Tubes."

The present invention relates generally to electric valve converting systems, and more particularly to electric valve converting systems for controlling the transmission of energy between two three phase alternating current circuits, by controlling the frequency of current flow in the output circuit with respect to the frequency of the voltage in the input circuit, over a wide range of values.

More particularly, my invention is adapted to transmit energy from a three phase alternating current supply circuit to a variable frequency alternating current load circuit, which may supply, for example, a three phase induction motor, or other similar load.

Basically, in my system a three phase supply line is connected directly, and without the interposition of transformers, to a three phase load line, through a plurality of gaseous conduction devices, the firing times of which may be controlled, relative to each other, and to the desired output frequency, in such manner as to supply to the output circuit substantially sinusoidal three phase currents of the desired frequency.

Control of the firing times of the gaseous conduction devices may be attained in various ways. In accordance with a first modification of the present invention, use is made of a small universal motor, the speed of which may be varied at will. This motor is utilized to drive a plurality of rotating switches, comprising commutator segments and associated brushes. The rotating switches then control the application of square wave bias voltages to the various gaseous conduction devices, these latter opening and closing power circuits at controlled intervals of time. By proper arrangements of the tubes and the rotating switches, the output frequency may be varied at will over an extremely wide range of values by varying the speed of rotation of the small induction motor, and only six independent bias voltage sources need be utilized.

In accordance with another embodiment of the invention, instead of utilizing rotating switches, in the form of commutators, I utilize translating switches, having opened and closed positions, which are actuated in proper time relation by means of a group of actuating arms which are themselves subject to translatory motion. The actuating arms may be actuated in paraphase relation in response to rotation of an eccentric, driven by a variable speed induction motor, in order to establish different output frequencies for the system.

In accordance with still a further modification of the present invention, the firing voltages for the gaseous conduction devices connected intermediate a three phase supply circuit and a three phase load circuit, are derived from two superposed high frequency signals, to provide a beat at the frequency desired in the output circuit, i. e., at the difference of frequency of the signals.

In accordance with the preferred form of the last described embodiment of the invention, the necessary high frequency signals are generated by superposing the outputs of two oscillators. The first one of the two oscillators is utilized to furnish a multiphase signal at a first frequency, for example, $F_0$. The second oscillator is then utilized to provide a second variable frequency $F$, which is quite close in value to the frequency $F_0$. The output of the second oscillator, at frequency $F$, is then superposed on the different phases of the multiphase output of the first oscillator at frequency $F_0$. The beats obtained in this manner, at a frequency $F-F_0$, represent then the control signals which are applied to isolating transformers, and from which may be derived, by rectifying, clipping and filtering, pulses which may be applied to fire the gaseous conduction devices in the desired frequency or cadence. These pulses are accurately maintained in desired relative phase, at any difference frequency, and the difference frequency may be accurately controlled by varying the frequency $F$.

I further provide an accurate and powerful A. F. C. circuit for maintaining the difference frequency constant by acting on the oscillator of frequency $F$, and maintaining the latter at a fixed frequency difference from frequency $F_0$, even if the latter should vary.

It is a basic object of the present invention to connect two inverse parallel connected gaseous conduction devices between each phase of a three phase supply line and each phase of a three phase load line, the latter containing a three phase load connected only to it.

It is a further object of the invention to provide a novel three phase to three phase frequency conversion system in which are required no transformers carrying power, although such transformers may be utilized for conveying control signals.

A prime object of the invention resides in the provision of a simple three phase to three phase frequency conversion system, for supplying variable frequency power to a simple and conventional three phase induction motor, which may be of the squirrel cage type, this system requiring no power transformers, and capable of adjustment over a continuous and large range of frequencies, whereby the speed of the motor may be readily, accurately and finely controlled over a wide range of values.

Another broad object of the invention resides in the provision of a system of three phase to three phase frequency conversion, requiring eighteen tubes, and in which the on-off condition of these tubes is controlled by a total of six control voltages, of identical frequency, and dephased in pairs by 120°.

A further broad object of the invention resides in the provision of a system of three phase to three phase frequency conversion, utilizing gaseous conduction devices of the control electrode controlled type, wherein effective control of the output frequency of the system over a wide range of values may be accomplished in response to a small number of D.-C. control voltages, derivable from bias batteries, or bias rectifiers, and applied to the control electrodes in cadence suited to the output frequency.

It is another object of the invention to provide a system for developing low frequency multiphase signals of variable frequency in response to the outputs of two relatively high frequency oscillators, at least one of which may be of variable frequency.

It is still another object of the present invention to provide a system for developing low frequency gating waves of variable frequency and duration by superposing two high frequency signals of variable relative frequencies, and clipping the resultant beat voltage at a suitable clipping level.

Another object of the invention resides in the provision of a system for generating gating waves of fixed relative phases for all repetition rates of the pulses, and wherein this repetition rate may be varied by varying the frequency of a single simple sinusoidal oscillator.

The above and still further features, objects and advantages of the invention will be apparent upon consideration of the following detailed exposition of various embodiments thereof, especially when taken in conjunction with the accompanying drawings, wherein.

Figure 1:
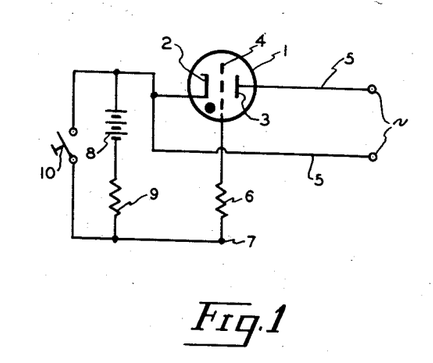
Figure 1 is a schematic circuit diagram of a circuit for controlling firing of a gaseous conduction device of the control electrode controlled type, in response to opening and closure of a switch.

Referring now more particularly to Figure 1 of the accompanying drawings, there is illustrated a system for controlling the conductivity of a gaseous conduction device (sometimes called hereinafter a "tube") in response to opening and closure of a switch. The referrence numeral 1 represents a gaseous conduction device, such as a thyratron, having a cathode 2, an anode 3 and a control electrode 4. Alternating voltage is applied between the cathode 2 and the anode 3 by means of supply lines 5. The control electrode 4 is connected in series with a resistance 6 have a terminal remote from the control electrode, designated by the reference numberal 7. Connected between the cathode 2 and the terminal 7, in series, is a source of negative bias 8 and a resistance 9. Connected across the latter is a switch 10, which may be opened and closed in any desired rhythm. The gaseous conduction device or thyratron 3 accordingly provides a switching circuit for the alternating current lines 5, the tube being conductive, and closing the circuit, when switch 10 is closed, and opening the circuit when switch 10 is open. If the switch 10 is opened and closed in a given cadence, current flow in the alternating current line 5 will be at least roughly speaking in that same cadence.

It will be noted that when the switch 10 is open no current flows in the resistance 9, and the entire bias voltage available from the battery 8 is applied to the control electrode 4. This bias voltage is sufficient to maintain the device 1 in nonconductive state. Upon closure of the switch 10 the terminal 7 acquires the potential of the positive end of the battery 8, or is connected directly to the cathode 2. In this condition the device 1 becomes conductive.

The function of the resistance 6 is to prevent appreciable flow of current in the grid circuit of the device 1, even when the latter is positive with respect to the cathode 2. A recommended value for the resistor 6 is 20,000 ohms. At the same time, the resistor 9 may be selected at about 3,000 ohms, so that the current passed by the battery 8 has no effect on the operation of the circuit.

While I have shown a battery 8 utilized as a source of bias voltage, it will be obvious that, in the alternative, bias voltage may be derived from a rectifier, in a manner conventional per se.

Figure 2:
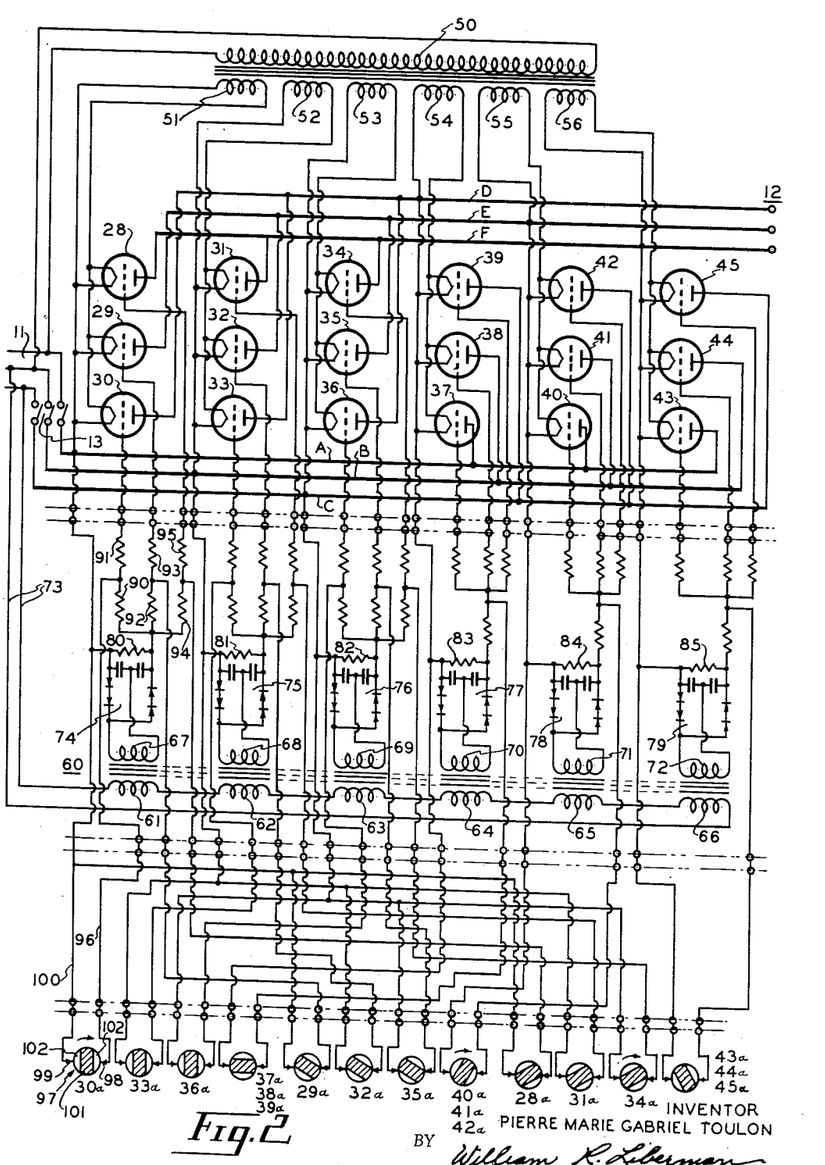
Figure 2 is a schematic circuit diagram of a three phase to three phase frequency conversion system, in which the output frequency of the system is controlled in accordance with the rotational speed of a commutator type switch.

The circuit of Figure 1 is a basic element of the system of Figure 2, being utilized therein for controlling the conductivity of each of 18 gaseous conduction devices which are connected intermediate a three phase supply line 11, and a three phase load line 12, and which serve to control the frequency of current flow in the load line 12, in response to voltage in the supply line 11, which may be assumed to be commercial frequency, such as 50 or 60 cycles per second.

The three phase supply line 11 may be connected via switch 13 to three buses, corresponding with the phases A, B and C. The corresponding phases of the output three phase lines are denominated D, E and F.

Eighteen tubes are utilized in the present systems, each a control electrode controlled gaseous conduction device such as a thyratron, although it will be clear that ignitrons or other gaseous conduction devices may be utilized, if desired. The gaseous conduction devices are arranged in groups of three, there being six such groups, and the tubes of the first group being identified by the reference numerals 28, 31, 34, those of the second group by the reference numerals 29, 32, 35, those of the third group by the reference numerals 30, 33, 36, those of the fourth group by the reference numerals 37, 38, 39, those of the fifth group by the reference numerals 40, 41, 42, and those of the sixth group by the reference numerals 43, 44 and 45.

The anodes of the first group of tubes 28, 31 and 34 are connected together and to the phase D of the load line. The anodes of the second group of tubes 29, 32 and 35 are connected together and to the phase E of the load line. The anodes of the third group of tubes 30, 33 and 36 are likewise connected together and to the phase F of the load line.

The cathodes of the fourth group of tubes 37, 38, 39 are connected toegther and to the phase D of the load line. The cathodes of the fifth group of tubes are connected together and to the phase E of the load line and the cathodes of the sixth group of tubes, 43, 44 and 45 are connected together and to the phase F of the load line.

The cathodes of the first group of tubes 28, 31 and 34 are connected, respectively, to the lines A, B and C of the supply line, the cathodes of the second group of tubes 29, 32 and 35 are connected respectively to the phases A, B and C of the supply line, and the cathodes of the third group of tubes 30, 33 and 36 are similarly connected respectively to the phases A, B and C of the supply line. Accordingly, the tubes of the first three groups, respectively, connect the load line phases separately to all the phases of the supply line, or conduct D.-C. current back from any load line phase to the entire supply line.

In a similar manner the anodes of the tubes 37, 38 and 39 are connected respectively to all the phases of the supply line, the anodes of the tubes 40, 41 and 42 are connected respectively to all the phases of the supply line, and the anodes of the tubes 43, 44 and 45 are connected respectively to all the phases of the supply line. Hence the last three groups of tubes connect all the phases of the supply line to any selected load phase in D.-C. relation.

The cathodes of all the tubes, in the event these tubes are thyratrons, may be energized from a single transformer having a single primary winding and six secondary windings. The primary winding 50 may be connected across two phases of the supply line 11, to provide single phase energizing current, and the six secondaries, designated by the reference numerals 51, 52, 53, 54, 55 and 56 may be connected each to one of the groups of three tubes, which have common cathode potentials. Thereby the problem of energizing the cathodes of the tubes is very materially simplified, and it is a virtue of the present system, that it is possible to so simplify cathode energization. This simplification is effected because the tubes are connected in groups of three having the cathodes of each group at the same potential at all times.

The fact that the gaseous conduction devices used in the present system for controlling flow of current from a supply 11 to a load line 12 may be divided into groups of three devices in each group, having identical cathode potentials, leads to a further simplification in respect to controlling the times of firing of some of the tubes, since a single electrically isolated rectifying system may be utilized to control the potentials on the control electrodes of three tubes comprised in a group.

The off-bias and firing voltages required are developed by means of a system comprising a transformer 60 having six primary windings in series. These primary windings may be respectively identified by the reference numerals 61, 62, 63, 64, 65 and 66. Associated with each primary winding is a separate secondary winding, the secondary windings being identified by the reference numerals 67, 68, 69, 70, 71 and 72. The primary windings of the transformer 60 may be energized by means of a line 73 connected across two phases of the supply line 11 and the secondary windings will then remain isolated from the supply line. Each secondary winding is supplied with a rectifier arrangement, which is per se conventional, the rectifier arrangements being identified by the reference numerals 74 to 79, inclusive, and each rectifier system having across its output a load resistor, across which is developed the rectified output supplied by the rectifier system. The load or output resistors provided for the rectifiers 74 to 79 respectively may be identified by reference numerals 80 to 85, respectively. The left hand terminals of each one of the load or output resistors 80 to 85 may then be connected to the cathodes of a different group of gaseous discharge devices simultaneously. For example, the left hand terminal of the load resistor 80 may be connected to phase A of a supply line 11, and thereby to the cathodes of the devices 28, 29 and 30. The left hand terminal of the load resistor 81, on the other hand, may be connected to phase B of supply line 11 and thereby to the cathodes of the group of discharge devices comprising tubes 31, 32 and 33. From the right hand terminals of each of the load or output resistors 80 to 82, inclusive, may be connected in parallel three pairs of series connected resistors, as 90, 91 or which is in parallel with 92, 93, which is in parallel with 94, 95. The series connected pairs of resistors, as 90, 91, may then each be connected directly with a control electrode of a gaseous conduction device. So the resistors 90, 91 in series may be connected with the control electrode of the device 30, the resistors 92, 93 in series may be connected with the control electrodes of the device 29 and the resistors 94, 95 in series may be connected with the control electrode of the device 28. Similar resistor arrangements may be provided for the tubes 31—36.

To the center tap between any pairs of series connected resistors, as 90, 91 or 92, 93 or 94, 95, may be connected control leads, which connect each with a brush of one of the commutator switches, and the remaining brush of any given commutator switch is connected with one of the phases of the supply line 11.

For example, in the case of resistors 90, 91 a lead 96 is connected to a brush 97 of the commutator segment 98. A further lead 99 is connected directly with phase A of the supply line 11, and consequently with the cathodes of the group of tubes designated by the numerals 28, 29, 30. The rectifier 74 maintains the line 96 at negative potential with respect to the line 100. Accordingly, so long as the switch 98 is closed the control electrode of the tube 30 remains negative with respect to its cathode and the tube cannot fire. Upon closing the circuit between the brushes 97, 98, when the commutator segment and the switch 98 are in proper orientation, the control electrode of the tube 30 acquires the same potential as the mid-point of the resistors 90, 91, which is directly connected to the cathode of the tube 30 through the lines 96, 100, and the control electrode accordingly rises to cathode potential and the tube fires.

Accordingly, the tubes 28 to 45 inclusive, may be controlled selectively by closing and opening simple switches. In the case of the embodiment of the invention illustrated in Figure 2 of the drawings, each switch comprises a rotating element 97 operating between two brushes 98, 99, a circuit being closed between the brushes for certain orientations of the rotating element 98 and the circuit being maintained open in other orientations thereof.

The arrangement described for controlling the firing of the tube 30, and involving a switch generally designated by the reference numeral 30a, and comprising brushes 97, 99 and the rotating element 97, is repeated for the tubes 33, 36, 29, 32, 35, 28, 31 and 34, the corresponding switch elements being designated by the same numerals of reference as the tubes, with the added letter $a$. Accordingly, the switch 36a controls the tube 36, etc.

It will be noted that three of the switches illustrated in Figure 2 of the accompanying drawings are provided with three numerals of reference simultaneously. For example, the switch immediately to the right of the switch 36a has applied thereto the reference numerals 37a, 38a and 39a. This is for the reason that this single switch controls simultaneously the tubes 37, 38 and 39. These tubes comprise a group of three tubes, the cathodes of which are at the same potential, but wherein the cathodes are connected to a phase of the load line 12. The control electrodes of these tubes are, in the sequence of events required for correct operation of the present system, simultaneously raised to firing potential, but since the anodes of these tubes are connected to separate phases of the supply line 11, the tubes fire in sequence as the anode potentials rise to a suitable voltage for that purpose.

It follows that a total of 12 switches may be utilized to control the 18 tubes of the system. The rotary elements of the switches 28a to 45a may be rotated by means of an induction motor, the speed of which is controllable, and as the motor rotates, firing of the tubes is controlled in sequence, and in such manner that current flow in the load circuit 12 corresponds with, or is a function of, the speed of rotation of the rotary elements.

Considering any switch as 30a, it involves a conducting segment 101 which separates two insulating segments 102. It follows that when the brushes 98, 99 are in contact with the conducting segment 101 a circuit is completed therebetween, but that when the insulating segments 102 are in contact with the brushes 98, 99 an open circuit is present. The circumferential distance subtended by the conducting segment 101 at either end thereof, is 75°. The brushes, however, have finite widths. Accordingly, the circuit remains completed between the brushes for a time $$5 + \frac{L}{12}$$

and open for a time $$7 - \frac{L}{12}$$

where L represents the width of either brush. The circuit between the brushes, furthermore, is closed and opened twice for each revolution of the rotary element, so that each half rotation completes a cycle of events.

The conductive segments of the switches 30a, 33a, 36a are maintained parallel, and at a given instant may be assumed to be vertical, the corresponding brushes being horizontal. If now, all the brushes of the system be assumed to be horizontal, the conductive segment of the switches 37a, 38a, 39a, is horizontal.

The conductive segments of the switches 29a, 32a, 35a are identically oriented, and bear an angle —60° with respect to the conductive segments of switches 30a, 33a, 36a. Associated with the switches 29a, 32a and 35a is a further switch bearing three reference numerals 40a, 41a, 42a, the conductive segment of which is at right angles to the conductive segments of the three switches associated therewith.

A further group of four switches is provided, of which 28a, 31a, and 34a have conductive segments advanced 60° with respect to the conductive segments of the switches 30a, 33a, 36a, and the fourth of which, 43a, 44a, 45a, has a conductive segment at right angles to the conductive segments of the immediately associated switches 28a, 31a, 34a.

It follows from the arrangement of the conducting segments on the various switches 28a to 45a, that the tubes 30a, 33a and 36a are placed in firing condition simultaneously, and in alternation with the tubes 37, 38, 39. The tubes 29, 32 and 35 are placed in firing condition simultaneously and in alternation with tubes 40, 41 and 42. Similarly, the tubes 28, 31 and 34 are placed in firing condition simultaneously and in alternation with the tubes 43, 44 and 45.

The system disclosed above is relatively simple and easy to understand, but presents the disadvantage as a practical matter that the control of output frequency is obtained by means of rotating parts, and mechanical switches. It would be extremely advantageous to avoid the necessity for mechanical switching or commutation, and in point of fact, this is possible by employing electronically generated polyphase switching frequencies. The difficulty involved in employing electronically generated polyphase switching frequencies for controlling the gaseous conduction devices of the system is that the frequency of switching may become extremely low, of the order of five cycles per second, or even less, and that accordingly, the isolating transformers required to transfer firing signals to the control electrodes of the gaseous conduction devices may become very bulky and expensive. Additional problems arise in maintaining the amplitudes of the firing signals constant as frequency changes, in maintaining the phasing accurate, and in providing a simple way of varying frequency without distorting the firing signals.

I have, accordingly, devised a system for generating low frequency polyphase signals, by a process of mixing additively two relatively high frequency signals, and the transformers required for transferring the high frequency signals to the mixer circuit and rectifier, wherein the necessary D.-C. switching signals or firing signals for the gaseous conduction devices are generated, may be very small, economically fabricated high frequency transformers.

The problem of deriving a low frequency by mixing two high frequencies has been solved heretofore in the art, but the difficulty which exists in the present application is that the required low frequency signals are polyphase, and must be maintained accurately dephased with respect to one another, and of accurate amplitude, as frequency changes. I have, accordingly, devised a system for deriving low frequency polyphase signals, in which the phase relation of the signals, and their amplitudes, are accurately maintained, from two high frequency oscillators.

Basically, my novel system for obtaining low frequency polyphase signals involves the use of two oscillators, one of which may be shifted in frequency, and the other of which remains constant as to frequency. The output of the constant frequency oscillator is phase split, into as many phases as desired, and each of the polyphase high frequency signals so derived is mixed in the separate mixing device with the output of the frequency variable oscillator. The envelope of the outputs of the mixers then have a frequency equal to the difference between the frequencies of the oscillators, but the phases of the envelopes correspond with the phases of the polyphase high frequency signals derived from the stable frequency oscillator. The outputs of the mixers may then be clipped and rectified, to derive the necessary switching signals.

It is stressed at this point that while my novel system for deriving polyphase low frequency signals from single phase high frequency oscillators is applied, in accordance with a preferred application thereof, to the control of firing times of gaseous conduction devices, in a frequency conversion system, that the basic concepts are applicable to a wide variety of uses, and are not intended to be limited herein to any particular application.

Figure 4:
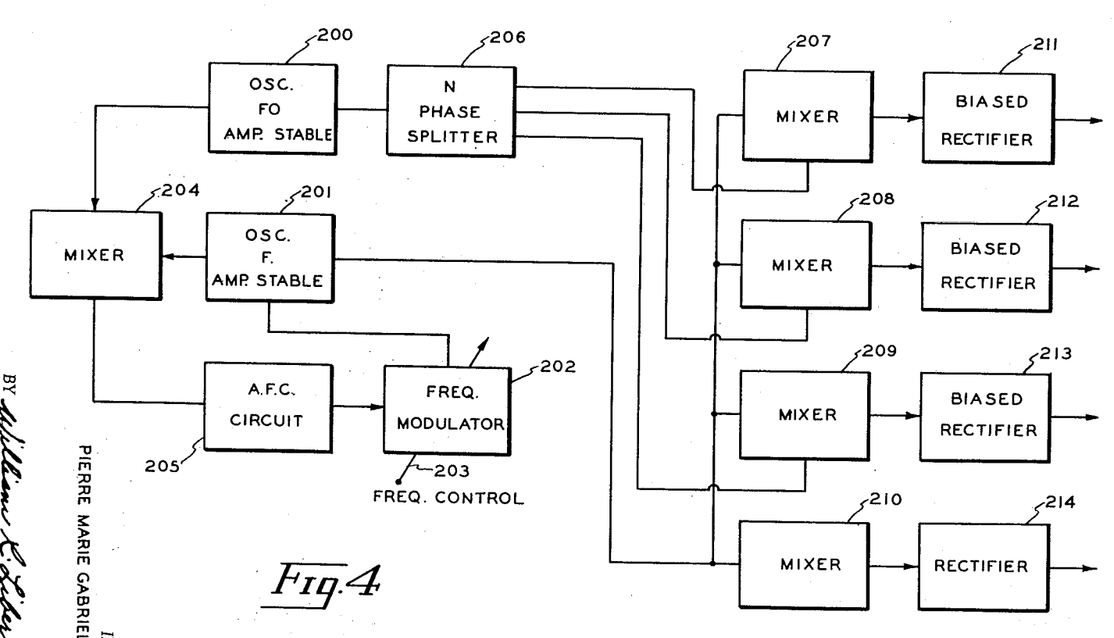
Figure 4 is a block diagram of a system for deriving polyphase gating waves of variable frequency, and fixed relative phase for all frequencies.

Reference is now made to Figure 4 of the accompanying drawings, wherein is illustrated in block diagram an embodiment of my system for developing polyphase low frequency signals from two high frequency signals, the frequency of the polyphase signals being variable in response to frequency change of one of the high frequency signals, without modification of the relative phases of the low frequency polyphase signals.

In Figure 4, the reference numeral 200 represents an oscillator of frequency $F_0$, and the amplitude of which may be assumed to be maintained stable by any means known per se to the art. The reference numeral 201 represents a further oscillator which generates a high frequency F, and again the oscillator 201 may be assumed to be stable in respect to output amplitude, this stability being accomplished by means known per se to the art. The oscillator 201 may be coupled with a frequency modulator 202, so that the frequency F is a variable frequency, variation being accomplished by adjustment of a frequency control denominated 203. The frequency $F_0$ may, for the purposes of the discussion, be assumed to be stable and constant.

In order that, once a given frequency has been established for the oscillator 201, by adjustment of the control 203, that frequency may be maintained, and thereby the low frequency output of the system maintained, the outputs of the oscillators 200 and 201 are applied to a mixer 204 (non-heterodyne), which derives a beat frequency, hereinafter called $f$, applying this beat frequency to an A. F. C. circuit 205, which derives control voltages applicable to the frequency modulator 202, for maintaining the frequency $f$ at a constant value, by suitably varying the output frequency F as necessary.

The output of the oscillator 200 at frequency $F_0$, is applied to a phase splitter 206, which generally may provide any desired number of output phases, equally separated. For the purpose of the present application of the invention disclosed in Figure 3 of the accompanying drawings, the phase splitter 206 may be a device for splitting into four phases. In its generality, however, the invention is equally applicable to phase splitting into any desired number of phases, and a hexaphase system is disclosed hereinafter. Each output phase obtainable from the phase splitter 206 is applied to a separate mixer. If, for example, four phases are utilized, four mixers will be utilized, and these may be denominated 207, 208, 209 and 210. The envelope of output of the mixers 207 to 210, inclusive, if there be also applied, to each of these, signals at frequency F derived from the oscillator 201, will be at the frequency $f = F_0 - F$. However, the phase of the envelope of each beat frequency, at any mixer, will correspond with the phase of the frequency $F_0$ as applied to that mixer, and accordingly the envelopes at the outputs of the mixers will be dephased. These beat frequencies may be rectified, to derive their envelopes, by means of rectifiers 211 to 214, inclusive, connected respectively to the mixers 207 to 210, respectively, so that at the outputs of the rectifiers will be available polyphase signals at frequency $f$, the output of each rectifier being dephased with respect to each of the others.

As the frequency of the oscillator 201 is changed, so the frequency of the outputs of the rectifiers 211 will be correspondingly changed, to maintain at all times an output frequency $f$ equal to the difference between the frequencies $F_0$ and F. But these changes will be accomplished without modifying the relative phases of the output signals.

Figure 5:
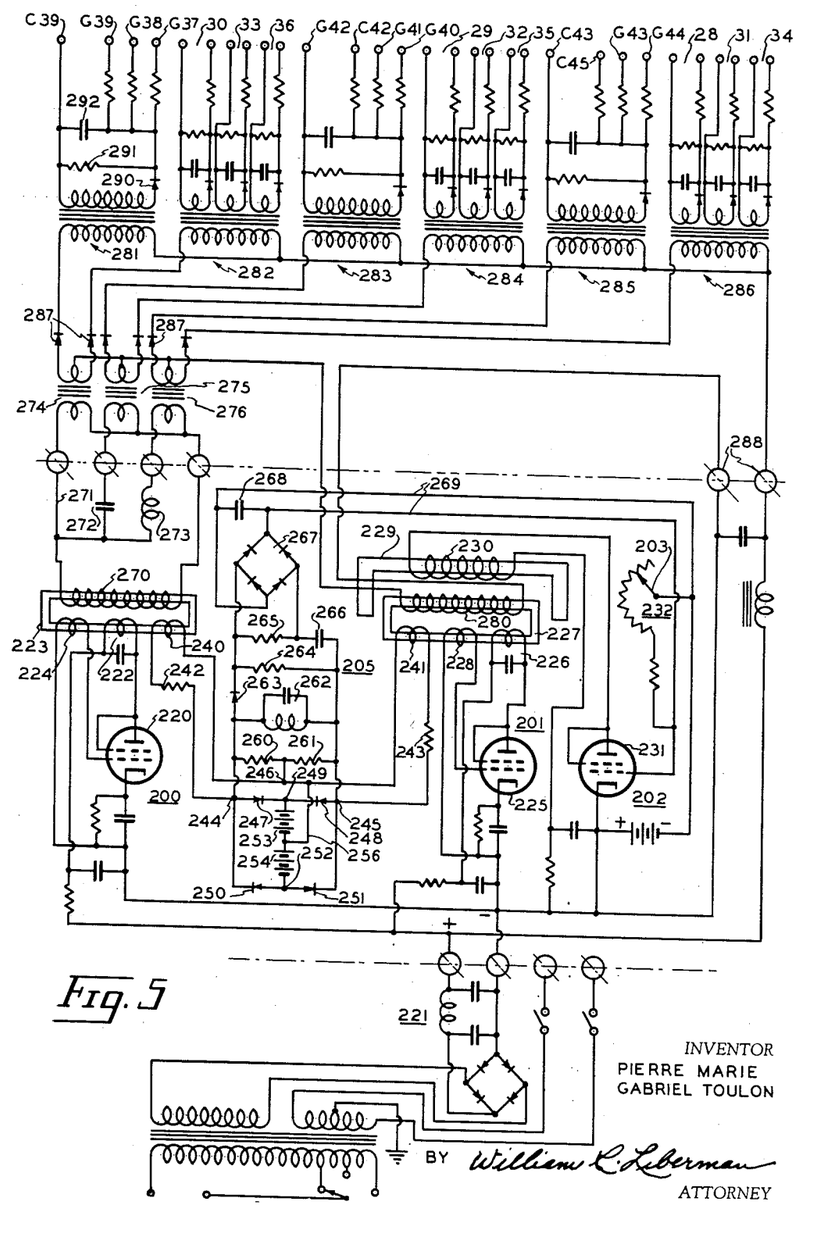
Figure 5 is a modification of the system of Figure 2, illustrated in schematic circuit diagram, in which gating waves for controlling the firing times of gaseous conduction devices of a system of Figure 2 are derived in accordance with the principles of the system of Figure 4.

The system which is illustrated in Figure 4 of the accompanying drawings in block diagram, is illustrated in Figure 5 of the accompanying drawings in schematic circuit diagram, as applied for deriving six phases of output signal.

Proceeding now with a description of the arrangement and mode of operation of the system illustrated in Figure 5 of the accompanying drawings, the oscillator 200, which provides the frequency $F_0$, comprises a triode vacuum tube 220, which is supplied with operating voltage from a rectifier system 221, and the anode circuit of which comprises an oscillating or tank circuit 222, the inductance of which is coupled with an iron core 223. Wound on this iron core 223 is a winding 224, which is connected with the grid of the tube 220, and which is so phased and designed as to maintain oscillations in the tube 220 and the tank circuit 222 thereof.

The variable frequency oscillator 201 comprises a triode tube 225, having a tank circuit 226, wound on an iron core 227, and on this iron core is also wound a further winding 228 which supplies a regenerative voltage to the grid of the triode 225, for maintaining oscillations in the tank circuit 226. The output of the oscillator 201 is a variable frequency F, while the output of the oscillator 200 is a fixed frequency $F_0$.

The core 227 is constituted of magnetic material of variable permeability, this permeability determining the output frequency F of the oscillator, and thus the frequency $f$. In order to vary the permeability of the core 227 there is provided a supplementary magnetic core 228, which has thereon a control winding 230, supplied with D.-C. current from a tube 231, in the modulator 202. As the D.-C. current flowing in the winding 230 is varied, the operating point of the core 227 is similarly varied, with a consequent change in permeability and a consequent variation of the frequency F. Operating conditions for the system are so selected that in the absence of current flow in the winding 230, the frequency $F_0$ provided by the oscillator 200 is considerably higher than the frequency F provided by the oscillator 201. As current flow in the winding 230 increases, and as consequently D.-C. magnetization of the core 227 increases, the inductance of the tank circuit 226 decreases, and the variable frequency approaches, and may even become greater than, the frequency $F_0$. Control of current flow in the winding 230 is accomplished by varying the negative grid bias of the tube 231 of the modulator 202, and this grid bias may be adjusted by varying the position of the control arm 203 of a potentiometer 232, and by varying the total voltage supplied to potentiometer 232.

Once a value of frequency F has been determined by adjustment of the control arm 203, there results an output frequency in the system, $f$, derived by superposing the frequencies $F_0$ and F. It is desired that the frequency $f$ be maintained constant, once it has been set, and this involves control of the frequency of the oscillator 201. An automatic frequency control system for the oscillator 201 is accordingly provided. At the same time it will be realized that it is the frequency $f$ which is ultimately desired to be controlled, and that the frequency $F_0$ of the oscillattor 200 may inadvertently vary. Accordingly, the automatic frequency control system is caused to operate in response to the difference of frequencies $F_0$ and F, to vary the frequency of the oscillator 201 so as to maintain this difference constant.

Since the amplitudes of outputs of the oscillators 200 and 201 may vary, and since the measurement of frequency difference of the oscillators may be affected by these differences in amplitude, means are provided for establishing constant and known values of output from the oscillators 200 and 201 prior to the frequency measurement.

On the core 228 is provided an auxiliary winding 240, a similar winding 241 being provided on the core 227. These windings, accordingly, develop signals at the frequency and amplitude of output of the respective oscillators 200 and 201. In series with the winding 240 is provided a current limiting resistor 242, and in series with the winding 241 a similar current limiting resistance 243. One terminal of the winding 240 is connected via the resistance 242 to a terminal point 244. The corresponding terminal of the winding 241 is connected via the resistance 243 to a terminal point 245, and the remaining terminals of the windings 240 and 241 are connected to a common point 246. Between the points 244 and 245 are connected oppositely poled rectifiers 247 and 248, at the connecting point between which is provided a terminal 249. A further pair of rectifiers 250 and 251 is connected in series across the terminals 244 and 245, at the junction point of which is provided a terminal 252. The rectifiers 247 and 250, which are connected in common to the terminal 244 are, however, oppositely poled. Between the terminals 249 and 252 are connected two voltage sources, which may be assumed to remain constant and which are denominated respectively 253 and 254. These voltage sources are connected in series aiding relation, and to their mid point is connected a lead 256 connecting to the terminal 246.

Accordingly, each pair of rectifiers, as 247 and 248, or 250 and 251, are biased off in opposite directions and conduct current in opposite directions. The voltage sources 253 and 254, accordingly, prevent current flow from the windings 240 and 241, so long as these currents are driven by voltages less than the voltage of either battery 253, in either direction, but permit such passage should the current exceed the value set by the bias batteries 253, 254. Thereby, the magnitude of voltage developed across the windings 240 and 241 are effectively limited to values equal substantially to the voltages of the bias batteries 253 and 254.

The limited or clipped voltages available from the coils 240 and 241 are applied respectively across resistances 260 and 261. Since these voltages are at different frequencies, a beat between the two is developed. Connected across the resistances 260 and 261, in series, is a tuned circuit 262, having an operating point at half the difference in frequencies $F_0-F$ when these have their maximum separation. Accordingly, the voltage developed across the tuned circuit 262, which acts as a discriminator circuit, is a function of this difference of frequency. The voltage developed across the tuned circuit 262 is rectified in a rectifier 263 and developed across a load resistance 264. Connected across the resistance 264 is a further resistance 265 in series with an isolating condenser 266, so that across the resistance 265 is developed an A.-C. current proportional in amplitude to the difference in frequencies $F_0-F$. This current is recified by means of a conventional rectifier bridge 267, provided with a filter condenser 268, across which is accordingly developed a D.-C. voltage proportional to the frequency difference $F_0-F=f$. This voltage is applied to reduce the negative grid bias of the tube 231 via leads 269.

The function of the potentiometer 232 hereinbefore referred to, is to determine what portion of the positive control voltage shall be applied to the control electrode of the tube 231, and accordingly, the difference frequency $f$ may be determined by controlling the amount of frequency control voltage supplied from the A. F. C. circuit comprising discriminator 262, and which is applied to control the conductivity of the tube 231. Initially $F_0-F$ is set large, resulting in development of a large positive bias voltage across condenser 68, which reduces $F_0-F$ until its value is about 5 cycles per second, by increasing F.

In one specific example of my invention, short circuiting of the potentiometer 263 would result in minimum positive control voltage applied to the tube 231, low current flow, low magnetic saturation in modulator 202, and hence high inductance, and low frequency F, and consequently maximum value for the frequency $f$. This value may be selected to be approximately 200 cycles per second, and by increasing the value of the positive control bias supplied to the tube 231, by adjustment of control arm 203, the frequency $f$ may be reduced to a value in the neighborhood of five cycles per second or less.

The output of the oscillator 200 is derived by means of a winding 270 wound about the core 223. One lead of this winding is connected in parallel to three separate circuits, one of which contains no impedance, as at 271, while the other contains a condenser 272 and the third an inductance 273. These three circuits then comprise a polyphase phase splitter, and all return to the remaining lead of the winding 270, through the primary windings of separate transformers 274, 275 and 276. These transformer primaries accordingly carry only the frequency $F_0$, and may be of very small size, and consequently may be economically fabricated. The secondaries of these transformers are supplied at their mid taps with voltage derived from a winding 280, wound on the core of 227 of the oscillator 201.

Since each secondary winding of transformers 274, 275 and 276 is center tapped, the signal at frequency $F_0$ exists in opposite phases on either side of the center tap. Since signal at frequency $F$ is applied to the transformers at the center tap currents at this frequency flow in identical phase in both sides of each secondary, and the secondary windings serve to add the currents at frequency $F_0$ and $f$. Each half of a secondary winding of the transformers 274, 275, 276 is connected in series with a transformer primary of transformers 281, 282, 283, 284, 285 and 286, and each in series with a rectifier, all of which are designated by the reference numeral 287. These rectifiers 287 are poled in a single direction only, and are biased against passage of current in the direction in which they normally pass current by the voltage available at the terminals 287, this being a D.-C. voltage derivable from the rectifier 221.

It follows that current flow in the primary windings 281–286, inclusive, occurs only when current flow is permitted by the appropriate one of the rectifiers 287, and this occurs for one polarity only of current flow, and then provided that driving voltage has exceeded a predetermined amount. The current which flows in any one of the windings 281 to 286, inclusive, therefore corresponds only to the peaks of the envelope of the superposed currents flowing in the secondary halves of the transformers 274, 275, 276, and by adjustment of the bias, the durations of these peaks may be adjusted to have any desired duration, from zero to one-half cycle of the envelope frequency of the superposed waves. This envelope frequency is $f$, or is equal to the difference between $F$ and $F_0$. It follows that the pulses applied to the transformer primaries 281 to 286, consisting of portions of the beat envelope, occur also at the frequency $f$.

Each of the transformers 281, 283, 285, is provided with a transformer secondary winding, and each of these secondary windings is connected in series with a rectifier, as 290 in the case of the transformer 281, in series with a load resistance 291 and a filter condenser 292, and the voltage across the load resistance 291 is then available for application as bias voltage to the appropriate control electrode controlled gaseous discharge devices, of the system of Figure 2 of the accompanying drawings. To avoid unnecessary duplication in the drawings, the terminals of the load resistors have been labeled with the reference numerals applicable to the appropriate gaseous discharge devices, preceded by a C when the connection is made to a cathode and by a G when the connection is made to a grid.

The transformers 281, 283 and 285 correspond functionally with switches 37a, 38a, 39a and 40a, 41a, 42a, and 43a, 44a, 45a, in the system of Figure 2.

The transformers 282, 284, 286 are each provided with three secondary windings, having each a rectifier and filter, so that each transformer secondary is capable of controlling, independently, a single gaseous conduction device. These transformer secondaries correspond functionally with switches 30a, 33a, 36a, 39a, 32a, 35a, 38a, 31a, 34a, when taken from left to right, and the tube which each transformer secondary controls is noted at its terminals.

Figure 6:
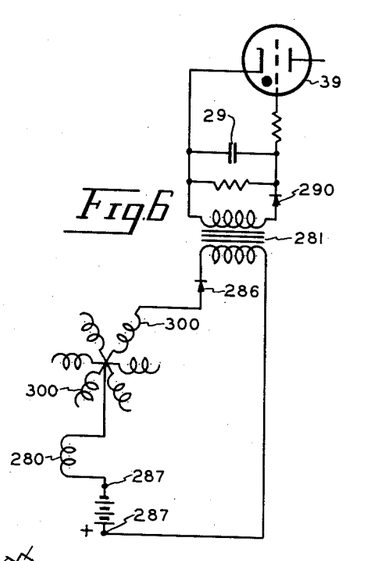
Figure 6 is a schematic circuit diagram of a portion of the system of Figure 5, illustrating how a single gating wave is derived and applied to a gaseous conduction device.

In order to clarify the operation of the present system in respect to derivation of firing pulses and their application to a single gaseous discharge device, a simplification of the system as applied to a single gaseous discharge device is presented in Figure 6, of the accompanying drawings. The terminals 287 are shown as having a battery therebetween, and the rectifier 286 is so poled with respect to the polarity of the battery, that no current flows in response to battery voltage. The battery in fact biases the rectifier 286 to prevent current flow in the direction of the arrow unless that current exceeds the voltage of the battery. Windings 300, center tapped, then represent the secondary windings of one of transformers 274, 275, 276, while winding 280 corresponds with the winding 280 of oscillator 201. It will be noted that these windings are connected in series with each other, with the rectifier 286 and with the battery, as well as with a primary winding of an output transformer, which may represent the transformer 281. Signal at frequency $F_0$ then tends to flow in winding 300 and signal at frequency $F$ tends to flow in winding 280. These windings being in series, the two induced voltages are superposed, and a beat results. When the amplitude of this beat exceeds the bias applied to the rectifier 286 current flows, and this current flows through the primary of the transformer 281. The secondary of the transformer 281 is supplied with a rectifier 290 and a load resistance 291, across which is connected a filter condenser 292. The load resistor 291 is connected between cathode and control electrode of a gaseous conduction device, such as 39. When pulsations of high frequency current occur in the transformer 281, these are rectified by the rectifier 290 and filtered by condenser 292, so that across the resistance 291 appears an envelope of these pulsations. This envelope is then applied to the tube 39 as a firing voltage. It will be realized that when the firing pulse exceeds a given amplitude, if it is positive, grid current flow takes place in the tube 39, resulting in a clipping action on the bias voltage pulse. Accordingly, the latter appears roughly in the form of a trapezoid, or modified square wave.

It follows from what has been recited above that the thyratron 39 in Figure 6 must be one which does not fire when the grid is at cathode potential, but is fired when the grid is raised above cathode potential. Were it necessary to utilize a thyratron which fires when the grid reaches cathode potential, bias voltage could be supplied to maintain the grid normally negative in the circuit of Figure 6.

Figure 7:
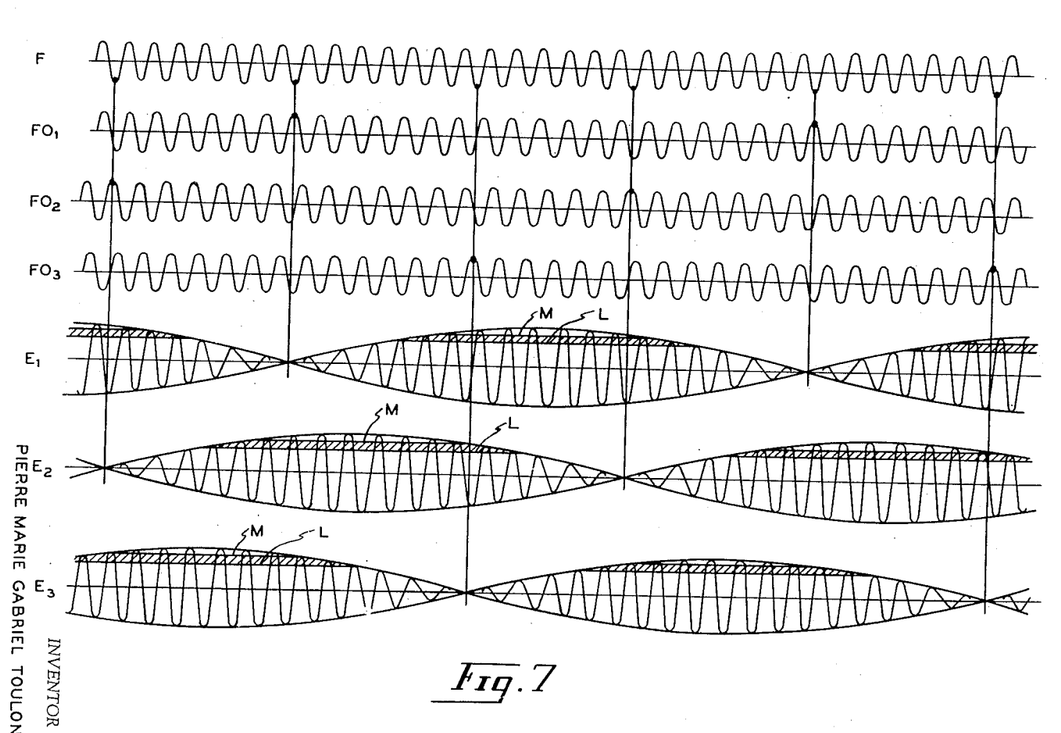
Figure 7 is a wave form diagram, illustrating the characters and the phase relationships of various control signals utilized in the systems of Figure 5 of the accompanying drawings; and, Figure 8 is a timing diagram, showing the fired and unfired condition of the tubes of the systems of Figures 2 and 5, and the directions of current flow, for various angular positions of the gating waves which control the devices. In the system of Figure 2, this angular relationship is equivalent to the angular position of a commutator switch, while in the system of Figure 5 it is equivalent to the phase relation of electronically generated gating waves.

Figure 7 illustrates certain wave forms of voltages and currents appearing in the system of Figure 5.

If the curves $F_{01}$, $F_{02}$, and $F_{03}$ represent the currents in the primary windings of transformers 274, 275, and 276, respectively, and the curve F, the currents at variable frequency F', then the addition or mixing of curves F and $F_{03}$ is represented by curve $E_1$, the addition or mixing of curves F and $F_{01}$ is represented by $E_2$ and the addition or mixing of curves F and $F_{02}$ by curve $E_3$.

The curves $E_1$, $E_2$ and $E_3$ have each an envelope varying at frequency $f = F_0 - F$, and the phases of the envelopes are directly equal, at the frequency $f$, to the phases of the waves $F_{01}$, $F_{02}$, and $F_{03}$ at the frequency $F_0$. This phase relationship moreover, is maintained for all values of the frequency $F_0$.

The biased rectifiers 287 prevent current flow in primary windings of transformers 281–286 inclusive, in response to the entire voltage applied, i. e., the appropriate ones of envelopes $E_1$, $E_2$, $E_3$, taken in appropriate phase, but passes current only when the envelope exceeds a given level L in a positive direction, that level set by the bias voltage, provided at 288. Accordingly, current flow in transformers 281–286 occurs only in respect to that portion of the envelope involved which exceeds the level L, and established by this bias voltage. Those portions of the envelopes which do pass the rectifiers 287 induce pulses of high frequency voltage in the secondaries of transformers 281–286, inclusive, which are transformed into D.-C. pulses by rectifiers 290, load resistors 291, and filter condensers 292.

These pulses, when applied in a positive going sense to the control electrodes of gaseous conduction devices, render these in conductive state, and when firing occurs the pulses are clipped at a level M by grid current flow, so that the finally resulting firing pulses correspond with the cross hatched portions of waves $E_1$, $E_2$ and $E_3$.

It will be clear that six such firing pulses will be developed in the system, in hexaphase relation, for application to the eighteen gaseous conduction devices by groups of three, since to each of waves $E_1$, $E_2$ $E_3$, in Figure 6 of the accompanying drawings, corresponds a precisely similar wave of opposite phase, by reason of the split or center tapped secondary windings of transformers 274, 275, 276, and the use of a separate rectifier, as 287, and primary winding, as one of 281–286, inclusive, in each secondary half.

The gaseous conduction devices or tubes, 28–45, inclusive, have been stated to be placed in firing condition simultaneously in groups of three.

Figure 8:
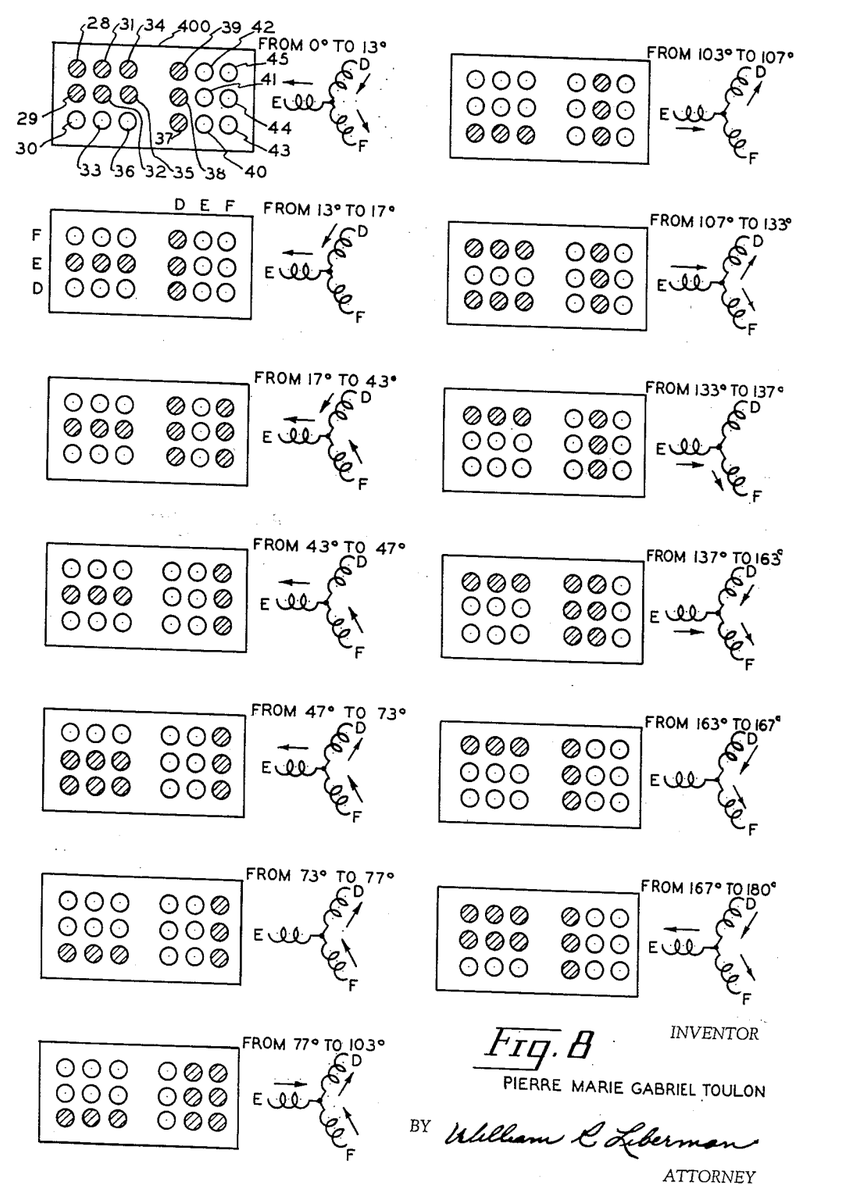

The relation of the firing condition of the tubes to the angular position of switches 38a–45a, is provided in Figure 8 of the accompanying drawings. For the purpose of Figure 8, the switch 38a is assumed to have its conductive segment 101 at 0°. Each block, as 400, in Figure 8, contains eighteen (18) circles, some cross-hatched and some not cross-hatched. The cross-hatched circles represent tubes in firing condition, and those not cross-hatched represent tubes in non-firing condition. The tubes of any group fire, of course, cyclically, as their anodes reach adequate firing potential, and when any tube of a group of three is fired, the remaining two are unfired, and that tube of a group is fired which is subject to maximum anode voltage, at any given instant. This much is per se, conventional.

However, for any angular position of the switches 28a–45a, certain groups of tubes fire, and continue firing until the angular position is sufficiently changed. Each block in Figure 8 represents conditions for a given range of angular positions, noted beside the blocks, and the cycle of events repeats during each 180° of rotation.

It will be noted that the groups of tubes may be considered as made up of two differently connected types, i. e., those which have anodes connected to an identical phase of the load line and cathodes each to a different phase of the supply line, and those having cathodes connected to an identical phase of the load line, and anodes each to a different phase of the supply line. The former tubes are grouped as follows:

Group (1) 28, 31, 34
(2) 29, 32, 35
(3) 30, 33, 36 and the latter as follows:

Group (4) 37, 38, 39
(5) 40, 41, 42
(6) 43, 44, 45

The tubes of each one of these groups are placed in firing condition as a unit, and for a given angular position of the switches 38a–45a continue to fire. If, for example, the angular position of the switches 28a–45a is as illustrated in Figure 2 of the accompanying drawings, i. e., at 0°, groups (1), (2) and (4) fire.

Group (4) contains three tubes having anodes, respectively, connected to all the supply phases, and cathodes all connected to phase D of the load line. Phase D of the load line is assumed connected to a Y connected load, which may represent a squirrel cage motor, through which current flow to the other phases, E and F, takes place. Tubes of group (3) have their anodes all connected to phase D of the load line, but these tubes remain unfired. This condition is required to avoid a short circuit from phase D back to the supply line. Tubes of groups (1) and (2) are in firing condition, and these tubes connect phases E and F back to all phases of the supply line.

Circuits are completed from each phase of the supply line, through a phase of a three phase load and back to another phase of the supply line, in sequence, as the phase voltages permit. Current flow in each phase of the load is, for a given switch condition, always in the same direction, so that, in effect, rectification is taking place, so long as the position of the control switches 28a–45a, inclusive, is maintained, and D.-C. current flows in each phase of the Y connected load.

As the switch 28a–45a is slowly rotated, the conditions of the previous paragraph continue in existence until the switch makes an angle of about 13°, counter-clockwise, with its original position, as illustrated in Figure 2. At that time the tubes of group (2) become unfired, temporarily eliminating current flow from phase F of the load.

At about 17° the tubes of groups (2), (4) and (6) are placed in firing condition. This means that current flow occurs from each phase of the supply line to phases D and F of the load line. Current passes from phases D and E through two phases of the load, to neutral, and back to phase E of the load line through the remaining phase of the load. From phase E of the load line current flows through tubes 29, 32, 35, i. e. the tubes of group (2), back to the phases A, B, C, of the supply line. This condition subsists until the angular position of the switches passes 43°.

By similar analysis, and by reference to Figure 8 of the accompanying drawings, the paths of current flow at any angular position of switch system 28—45 may readily be deduced, and it will be noted that current flow in each phase of the load is of alternating nature, each cycle being completed during 180° rotation of the switch system.

The analysis of the operation of the system above given has been directly related to the system of Figure 2 of the drawings. However, the analysis applies with equal force to the system of Figure 5, wherein the gaseous conduction devices are supplied with gating waves by a wholly electronic system instead of by mechanical switches which control D.-C. sources, or rectifiers. For that reason, a repetition of the analysis is dispensed with.

Figure 3:
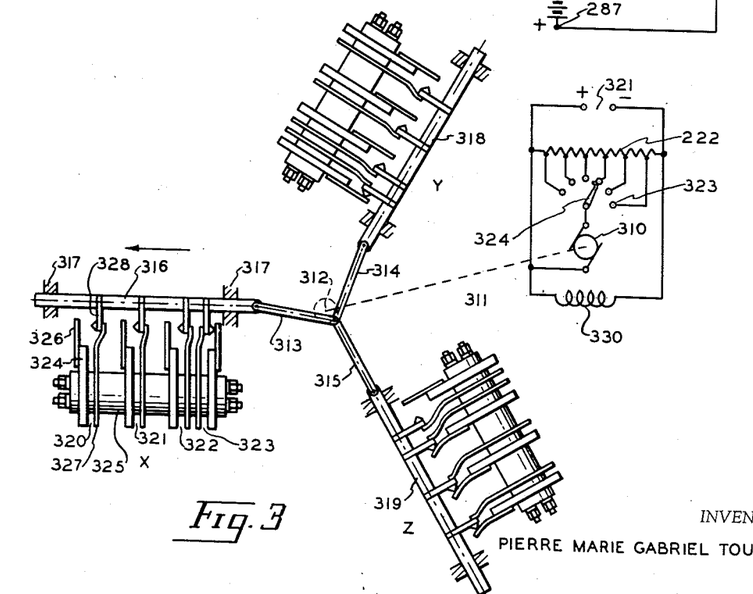
Figure 3 is a view in front elevation of a reciprocating switching system, which may be substituted for the communtator type switch illustrated in the system of Figure 2.

In Figure 3 of the accompanying drawings is illustrated a switching system which may be substituted for the commutator type switching system 28a—45a of Figure 2 of the accompanying drawings. In the switching system of Figure 3, the reference numeral 310 designates an electric motor, the speed of which may be controlled, and which drives, via a mechanical link 311, an eccentric 312. The eccentric 312 drives three connecting rods 313, 314 and 315, these connecting rods being angularly displaced with respect to one another by an angle of 120°. The connecting rod 313 actuates a translating rod 316 which moves in bearings 317. Similarly, the connecting rod 314 actuates a translating rod 318 and the connecting rod 315 actuates a translating rod 319. By virtue of the 120° space relationship of the connecting rods 313, 314, 315, the translating rods 316, 318 and 319 are actuated in 120° time relationship, at the frequency of rotation of the eccentric 312. The switches actuated by the translating arms 316, 318 and 319 may be respectively designated switches X, Y and Z for purposes of convenience, and it will be apparent that these switches are all duplicates in structure, although actuated in 120° phase relation, so that description of one of the switches, say X, will suffice for all.

Referring now to switch X, this switch consists of four circuit making and breaking elements, designated respectively by the reference numerals 320, 321, 322 and 323. The circuit making and breaking elements 320, 321, 322 operate identically, i. e., close and open simultaneously, while the circuit making and breaking element 323 closes when the elements 320 to 322 close, and vice versa.

Each one of the circuit making and breaking elements, as 320, taken for example, consists of a stationary element 324, which is conductive, and rather stiff, and which is mounted in insulated relation, upon a cylinder 325. Secured to the upper end of the element 324 is a flexible switch blade 326. In slightly spaced relation to the element 324 is a flexible lead element 327, mounted on the cylinder 325 in insulated relation, and secured to the upper end of the lead element 327 is a stiff switch contact 328, having a switch point at its lower end, and secured to the reciprocating arm 316 at its upper end.

As the reciprocating arm 316 reciprocates, the contact of the switch plate 328 moves into and out of contact with the flexible switch blade 326, carrying with it the upper end of the flexible lead 327.

The structure described for the circuit making and breaking element 320, is also utilized for the circuit making and breaking elements 321, 322, 323, of which circuit making and breaking elements 321 and 322 are identical with 320, and operate synchronously therewith, while circuit making and circuit breaking element 321, while structurally similar is inverted, and is closed by motions of the reciprocating arm 316 which open the circuit making and breaking elements 320—322, and vice versa.

The elements of the switches X, Y and Z may obviously perform the circuit making and breaking functions of the commutator type switches 28a to 45a, inclusive. So the switch 320 may perform the function of the switch 30a, the switch 321 may perform the function of the switch 33a, the switch 322 may perform the function of the switch 36a, while the switch 322 may perform the functions of the switch 37a, 38a, 39a.

In order to control the rate of operation of the switching system of Figure 3, and thereby to control the output frequency of the system of the type illustrated in Figure 2, if the switching system of Figure 3 were employed therein, a separate field winding 330 is employed for the motor 310, operating at far higher potential than is necessary, so that the motor 310 operates at fairly constant torque. D. C. voltage is supplied to the motor 310 and to its field winding 320 from terminals 321, via a potentiometer or voltage divider 322, having a number of studs 323, selectable by means of a switch arm 324. It will be clear that at each of the studs 323 is available a different D.-C. voltage, and that since the motor 310 is connected between the switch arm 324 and the positive terminal of the line 321, that the voltage applied to the motor, and hence its speed, may be varied in steps, or in progressive fashion, by adjustment of the arm 324 into contact with a selected one of the studs.

It will be noted that my prior application Serial No. 188,297, hereinbefore referred to, contains disclosure relative to a mode of operating a three phase induction motor, when powered from a variable frequency circuit. The disclosure of that application, in the respect noted, is incorporated herein by reference, and the system disclosed, may profitably be employed in driving polyphase motors from the output of frequency conversion systems such as are disclosed and illustrated herein.

While I have described and illustrated several embodiments of my invention, it will be clear that variations of the general arrangement and of the details of construction which are specifically illustrated and described may be resorted to without departing from the true spirit and scope of the invention.

What I claim and desire to secure by Letters Patent of the United States is:

1. A system for generating a D.-C. gating wave comprising a source of oscillations of first frequency, a source of oscillations of second and different frequency, mixer means for superposing said oscillations to derive a beat envelope, means for deriving from said beat envelope only that frequency equal to the difference between said first and second frequencies, means for selecting as said gating wave from said beat envelope only that portion of the envelope which exceeds a predetermined value, and means for varying at least one of said first and second frequencies to vary the frequency of said gating wave.

2. A system for generating a D.-C. gating wave comprising a plurality of first impedances, means inducing voltage at a first frequency in said first impedances, means splitting said first frequency into a predetermined number of phases, a plurality of second impedances, means inducing voltage at a second frequency in said second impedances, a plurality of biased rectifiers, means for connecting selected of said first and second impedances and selected of said rectifiers in a plurality of series circuits, and means responsive to current flow in each of said series circuit for generating said gating wave.

3. The combination in accordance wtih claim 2 wherein one of said frequencies is variable to vary the frequency of said gating wave.

4. In a system for generating polyphase D.-C. gating waves, of fixed relative phases and variable frequency, a first oscillator for generating first oscillations of relatively fixed frequency, a second oscillator for generating second oscillations of relatively variable frequency, dephasing means coupled to said first oscillator for deriving from said first oscillator a group of relatively dephased oscillations having a fixed phase relation, means for superposing the output of said dephasing means with said second oscillations to generate beat envelopes which retain said fixed phase relation, means for clipping said beat envelopes at a predetermined level to separate portions of said beat envelopes which exceed said predetermined levels, and means for deriving said D.-C. gating waves from said separate portions of said beat envelopes.

5. In a system for generating polyphase low frequency waves of fixed relative phases and variable high frequency, a first oscillator for generating first oscillations of relatively fixed high frequency, a second oscillator for generating second oscillations of relatively variable high frequency, means for phase splitting one of said first and second oscillations to derive phase separated oscillations, and means for superposing on each of said phase separated oscillations the other of said oscillations, to generate beat envelopes having the phases of said phase separated oscillations and frequencies equal to the difference between said variable high frequency and said fixed high frequency.

6. In a frequency control system, means for generating first oscillations of a first fixed frequency, means for generating second oscillations of a second variable frequency, means for dephasing one of said oscillations and for superposing said dephased oscillations upon the other of said oscillations to generate a plurality of dephased beat envelopes having a frequency equal to the difference between said first and second frequency, a plurality of biased rectifiers respectively coupled to each of said dephased envelopes to produce a plurality of gating wave outputs, and means stabilizing said outputs comprising a frequency discriminator coupled to said means generating said first and second oscillations, said frequency discriminator having a response proportional to the frequency of said beat envelopes, and control means responsive to said frequency discriminator for controlling the frequency of said means for generating second oscillations in such sense and extent as to maintain constant the frequency of said beat envelope.

7. In a system for maintaining constant the frequency difference between the outputs of a first and a second oscillator, wherein said second oscillator comprises a tank circuit having a saturable core inductance whereby the frequency of said second oscillator increases as the saturation of said saturable core inductance increases and normally oscillates at a frequency below that of said first oscillator, means for additively superposing the outputs of said first and second oscillators to generate a beat envelope having a frequency equal to said frequency difference, a saturating winding for said saturable core inductance, a triode tube having a predetermined negative bias, means connecting said triode tube in current controlling relation with said saturating winding, and means responsive to the frequency of said beat envelope for decreasing said predetermined bias as said beat frequency increases.

8. A gating wave generator comprising a first oscillator having a first fixed frequency output, a second oscillator having a second variable frequency output, a phase splitter coupled to said first oscillator and having a plurality of outputs at said fixed frequency and of differing phases, a plurality of mixers coupled respectively to said outputs, means coupling said second oscillator to each of said mixers, and a plurality of biased rectifiers coupled respectively to each of said mixers.

9. The generator of claim 8 wherein said second oscillator includes a frequency modulator for varying the output of said second oscillator and means stabilizing the outputs of said generator comprising a further mixer coupled to each of said first and second oscillators and frequency control means coupling said further mixer to said frequency modulator.

References Cited in the file of this patent

UNITED STATES PATENTS

| Number | Name | Date |
| --- | --- | --- |
| 1,937,372 | Willis | Nov. 28, 1933 |
| 2,105,870 | Vance | Jan. 18, 1938 |
| 2,302,893 | Roberts | Nov. 24, 1942 |
| 2,405,239 | Seeley | Aug. 6, 1946 |
| 2,442,258 | Boyer | May 25, 1948 |
| 2,447,133 | Nims | Aug. 17, 1948 |
| 2,484,034 | Isbister | Oct. 11, 1949 |
| 2,488,297 | Lacy | Nov. 15, 1949 |
| 2,489,262 | Buckbee | Nov. 29, 1949 |
| 2,510,129 | Moore | June 6, 1950 |
| 2,519,030 | Dome | Aug. 15, 1950 |